Oct. 13, 1936. H. FRY 2,057,142
APPLIANCE FOR THE EXTRACTION OF WEEDS AND THE AERATION OF THE SOIL
Filed May 27, 1936
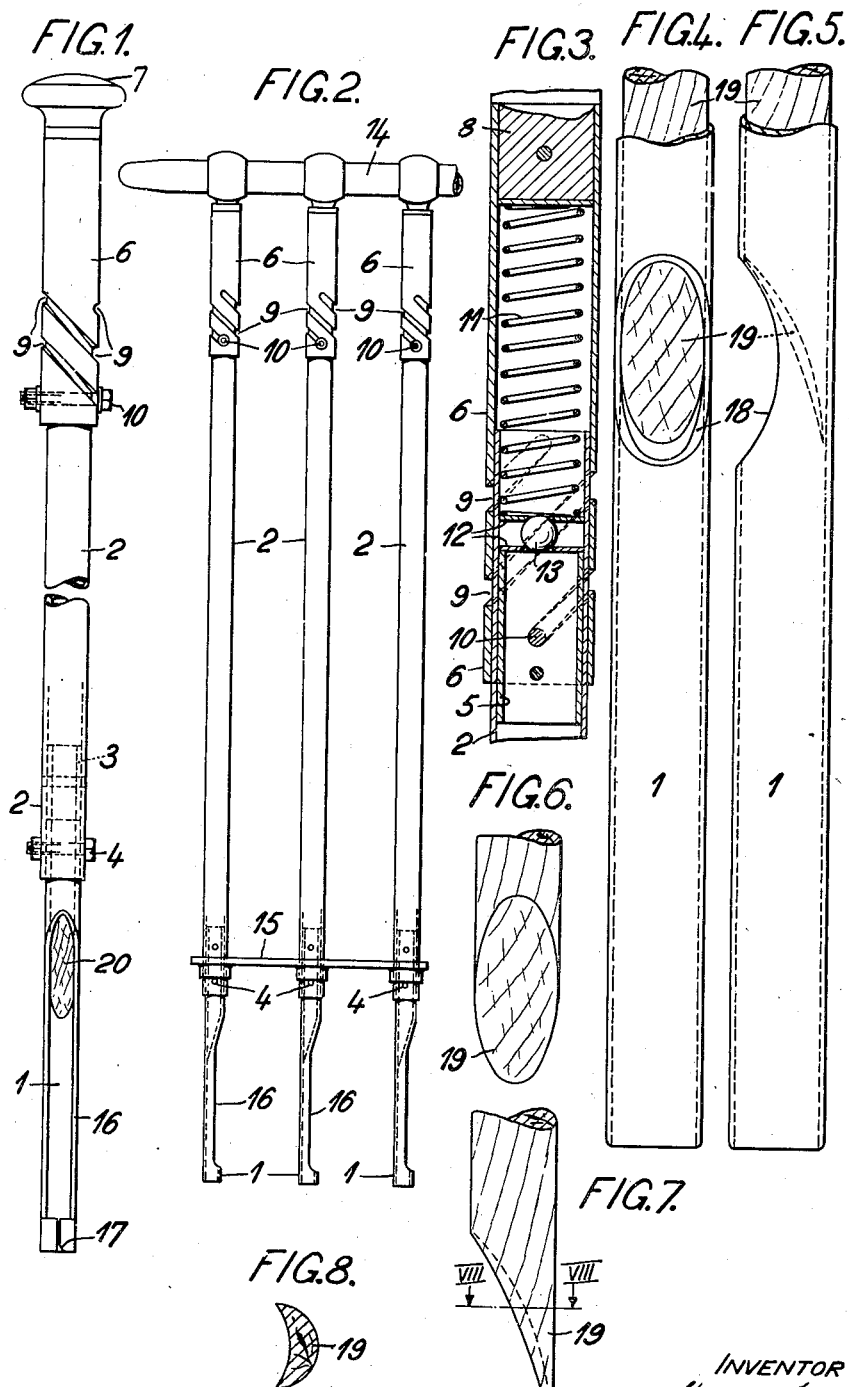

Patented Oct. 13, 1936

2,057,142

UNITED STATES PATENT OFFICE 2,057,142

APPLIANCE FOR THE EXTRACTION OF WEEDS AND THE AERATION OF THE SOIL

Henry Fry, Heathercroft, Northway, Bishopston, Wales

Application May 27, 1936, Serial No. 82,083
In Great Britain February 20, 1935

14 Claims. (Cl. 55—18)

This invention relates to apparatus for extracting weeds of all sorts from lawns, golf greens, pasture or cultivated land. Such an apparatus employs for the extracting operation a hollow cylindrical member with an aperture at one side, commonly called a tine. In use the tine is inserted in the ground so that the weed to be extracted enters the hollow cylinder and is removed through the aperture. Apparatus employing a plurality of tines are also used for aerating the soil.

An object of the invention is to improve the penetration of the tine for a given muscular effort of the operator.

A further object of the invention is to impart a rotary movement to the tine, whilst it is penetrating the ground, from a rectilinear movement on the apparatus by the operator.

Another object of the invention is to arrange means for automatically reversing the rotation of the tine when it is removed from the ground to return it to its original position ready for the next extracting operation.

Another object of the invention is to provide a tine in which the ejected weed or core does not prevent or hinder rotation of the tine during penetration.

A further object of the invention is to provide a tine from which the weed or core is smoothly ejected without breaking, in order to avoid clogging of the tine.

The invention is illustrated by way of example in the accompanying drawing, in which:—

Figure 1 shows a single weed extractor,

Figure 2 shows an apparatus embodying three weed extractors,

Figure 3 is a fragmentary longitudinal section of the extractor shown in Figure 1, Figures 4 and 5 are front and side elevations of an alternative form of tine, Figures 6 and 7 are front and side elevations of the deflector used in the tine shown in Figures 4 and 5, and Figure 8 is a section on the line 8—8 of Figure 7.

Referring now to Figures 1 and 3, the tine 1 is fitted within the lower end of a tube 2. The end of the tine bears against an abutment sleeve 3 riveted inside the tube 2. The tine is secured in position and prevented from rotation relatively to the tube by means of a bolt 4 passing through diagonally opposite holes in both the tine and tube 2.

Near its upper end another abutment sleeve 5 is riveted within the tube 2. This end of the tube 2 fits within a tube 6 of slightly larger diameter. A handle 7 has a boss 8 which fits into the top end of this tube 6 and is riveted to the tube as shown in Figure 3. The tube 6 has a pair of diagonally opposite helical slots 9 each of which makes one complete turn. A bolt 10 passes through diagonally opposite holes in the tube 2 and sleeve 5 and also through the slots 9 in the tube 6. In this way a rectilinear movement of the tube 6 relatively to the tube 2 causes a rotational movement of the tube 2 and therefore also of the tine 1, the two movements being correlated to one another by means of the bolt 10 and the inclined slots 9.

A helical spring 11 is fitted within the tube 6, its top end bearing against the boss 8 and its lower end against the tube 2 through a thrust race. This thrust race comprises a pair of ring shaped washers 12 with a ball 13 between them as shown in Figure 3.

In Figure 2, three weed extractors as shown in Figures 1 and 3 are combined in a single appliance. There is a common handle 14 having three bosses 8 which fit into the three tubes 6 of the extractors. The lower ends of the extractors are spaced by a bar 15 having three holes through which the tubes 2 of the extractor pass. The bar 15 is supported by the heads of the bolts 4 which secure the tines in position.

The tines 1 shown in Figures 1 and 2 have an elongated cut away ejecting opening 16 in the side. The lower end is ground to a cutting edge and has a rounded part 17. At the upper end of the tine a deflector 20 comprising a wooden plug is fixed within the tine and serves to deflect the weed or core cut out through the opening 16.

It should be understood that after inserting the appliance into the ground the weed or core remains within the body of the hollow cylindrical tine. When the tine is again inserted into the ground the weed or core previously cut out is ejected through the opening 16.

However in using a weed extractor as described with the tine illustrated in Figures 1 and 2, in some kinds of ground there is a tendency for the previously cut away weed or core to project through the elongated opening 16 and prevent or hinder rotation of the tine during penetration. An alternative form of tine is shown in Figures 4 to 8 which has not this disadvantage. This tine has a small ejecting opening 18 a substantial distance from the cutting edge at the bottom of the tine. This opening is situated far enough up the tine so as never to be inserted into the ground. There is therefore no possibility of hindrance of the tine rotating by ejection of the previously cut away weed or core. In this case the tine is constructed in one with the tube 2. A deflecting plug 19 is fitted within the tube 2 opposite the ejecting opening 18 and since this latter is smaller, with the consequent danger of becoming clogged, the surface of the deflector is concave in both directions as shown in Figures 7 and 8.

In operation the extractor is pressed against the ground by its handle. The tine can only rotate by compressing the spring 11. Thus the resistance to penetration causes the tine to rotate and so assist it in cutting into the ground.

If the ground were very soft and in consequence there was very little resistance to penetration, there would be scarcely any rotation of the tine during penetration. If however, the ground is hard and there is considerable resistance to penetration then the tine will rotate and have increased penetrating power by virtue of the cutting action obtained thereby. But the spring must be strong enough to ensure that penetration will take place whilst the tine is rotating, for the whole of the penetrating force applied to the tine is transmitted through the helical spring 11. For this purpose it may be necessary to fit different strengths of spring when using the apparatus on grounds of greatly varying hardness. However it has been found in practice that for all ordinary weed extracting uses on grassland such as is found on golf courses a single spring will be effective under all conditions of hardness of the ground likely to be encountered.

After the tine of the extractor has been inserted in the ground, relaxation of the pressure on the handle as the tine is withdrawn, will allow the tine to rotate back again under the influence of the helical spring which presses the bolt 10 to the bottom ends of the two slots 9, so resetting the tine to its original position ready for the next penetration.

It will be understood that the invention is not limited to the constructions which have been described, and in order to appreciate the whole scope of this invention reference should be made to the various claims appended hereafter.

What I claim is:—

1. In a weed extractor, a hollow rotatable cylindrical tine with a small ejecting aperture situated at a substantial distance from the penetrating end of the tine, and a deflector within said tine opposite said aperture with a concave deflecting surface.

2. In a weed extractor, a hollow rotatable tine, and a deflector within said tine, said deflector having a concave deflecting surface.

3. The combination set forth in claim 2, wherein the deflecting surface is doubly concave, whereby a horizontal cross-section is convexo-concave.

4. In a weed extractor, a handle, a tine-operating member rotatable with a correlated longitudinal movement relatively to said handle, and a spring between said handle and said member urging them apart.

5. In a weed extractor, a handle, a tine-operating member helically rotatable relatively to said handle, and a spring between said handle and said member urging them apart.

6. In a weed extractor, a handle, a tine-operating member, means operated by a rectilinear movement of said handle against resistance to penetration for rotating said member, and means for restoring said member to its original position when said resistance ceases.

7. In a weed extractor, a hollow rotatable cylindrical tine with an ejecting aperture situated at a substantial distance from the penetrating end of the tine, and rectilinearly-movable means for rotating the tine.

8. In a weed extractor, a handle having a cylindrical sleeve with a pair of diagonally opposite helical slots, a cylindrical tine-operating member fitted to said sleeve and having a pair of diagonally opposite projections each engaging a slot in said sleeve, and a helical spring urging said handle and said member apart.

9. A soil aerator, comprising a handle, a plurality of tine-operating members connected to said handle and arranged parallel with one another, tines mounted on said members, means operated by a rectilinear movement of the handles in a direction parallel with said members against resistance to penetration for rotating said tines, and means for restoring said tines to their original position when resistance to penetration ceases.

10. In a weed extractor, a handle having a cylindrical sleeve member with a pair of diagonally opposite helical slots, a cylindrical tine-operating member fitted within said sleeve and having a pair of diagonally opposite projections each engaging a slot in said sleeve, a helical spring within said sleeve member urging said handle and said tine-operating member apart, and a thrust race between said spring and one of said members.

11. A weed extractor, comprising a handle having a cylindrical sleeve member with a pair of diagonally opposite helical slots, a hollow cylindrical tine-operating member fitted within said sleeve and having an internal shoulder and a pair of diagonally opposite projections each engaging a slot in said sleeve, a helical spring within said sleeve member urging said handle and said tine-operating member apart, a pair of ring shaped discs fitted between said spring and said shoulder, a ball fitted between said pair of discs, and a tine mounted on said tine-operating member.

12. In a weed extractor, a hollow rotatable tine, and rectilinearly-movable means for rotating the tine.

13. In a weed extractor, a hollow tine, and means for imparting helical movement to the tine.

14. In a weed extractor, a hollow tine, and rectilinearly-movable means for imparting helical movement to the tine.

HENRY FRY.